United States Patent [19]

Rahman

[11] 4,291,675

[45] Sep. 29, 1981

[54] SOLAR ENERGY COLLECTOR

[76] Inventor: Muhammed A. Rahman, 1121 Arlington Blvd., T-221, Arlington, Va. 22209

[21] Appl. No.: 102,027

[22] Filed: Dec. 21, 1979

Related U.S. Application Data

[63] Continuation-in-part of Ser. No. 867,972, Feb. 6, 1978, abandoned.

[51] Int. Cl.³ ............................ F24J 3/02; A23C 3/04
[52] U.S. Cl. .................................. 126/432; 126/447; 126/449; 165/115
[58] Field of Search ............... 126/432, 447, 448, 449, 126/417; 165/115, 116

[56] References Cited

U.S. PATENT DOCUMENTS

| | | | |
|---|---|---|---|
| 3,985,117 | 10/1976 | Sallen | 126/447 |
| 4,003,365 | 1/1977 | Wiegand | 126/432 |
| 4,007,728 | 2/1977 | Guba | 126/449 |
| 4,019,496 | 4/1977 | Cummings | 126/449 |
| 4,085,732 | 4/1978 | Hysom | 126/449 |
| 4,120,283 | 10/1978 | Eder | 126/448 |
| 4,121,568 | 10/1978 | Olsen | 126/432 |
| 4,125,108 | 11/1978 | Porter et al. | 126/448 |
| 4,141,339 | 2/1979 | Weinstein | 126/449 |
| 4,142,513 | 3/1979 | Auger | 126/449 |
| 4,180,057 | 12/1979 | Ward | 126/449 |
| 4,191,170 | 3/1980 | Carrell | 126/449 |
| 4,201,194 | 5/1980 | Charles | 126/449 |
| 4,210,128 | 7/1980 | Mattson | 126/449 |
| 4,211,213 | 7/1980 | Nissen et al. | 126/449 |

Primary Examiner—Daniel J. O'Connor
Attorney, Agent, or Firm—Jack D. Rubenstein

[57] ABSTRACT

A solar energy collector is disclosed which is comprised of a base and a solar energy absorbing element spaced from the base. The solar energy absorbing element has an accordian-like shape including angularly disposed upper ridges and lower valleys interconnected by generally planar surfaces. The lower valleys are positioned immediately adjacent the base. Fluid supply conduits are positioned between the solar energy absorbing element and the base immediately adjacent the upper ridges. The fluid supply conduits are adapted to supply fluid adjacent the solar energy absorbing element upper ridges which fluid may then flow along the planar surfaces until dropping off the lower valleys onto the base, whereby heat absorbed by the solar energy absorbing element is transferred to the fluid. A trough is provided for receiving the flow of heated fluid along the base. The solar energy absorbing element lower valleys are positioned sufficiently close to the base such that the lower valleys are maintained in contact with the film of fluid flowing along the base, thereby further improving the heat transfer efficiency of the disclosed solar energy collector. The fluid supply conduits are provided with incrementally larger internal dimensions in a direction away from the trough for providing an incrementally increased flow of fluid over the solar energy absorbing element in a direction away from the trough, whereby fluid which must travel a greater distance to the trough will be provided in larger quantity.

9 Claims, 4 Drawing Figures

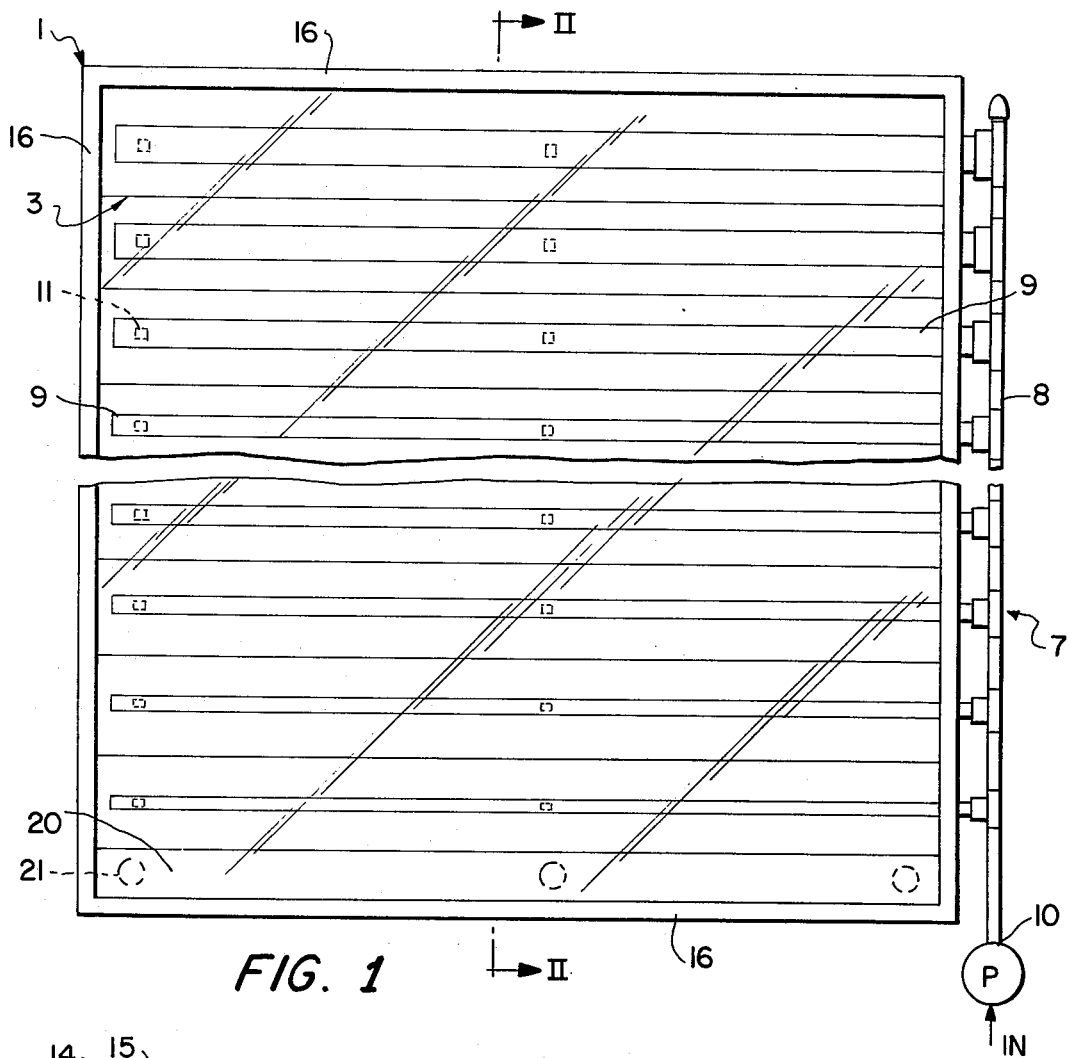
FIG. 1
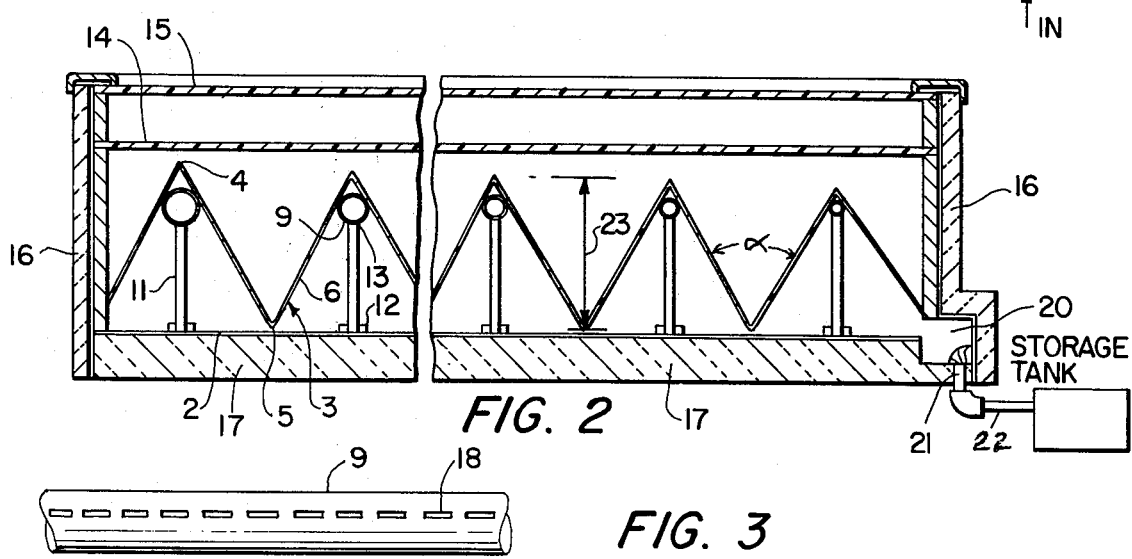
FIG. 2
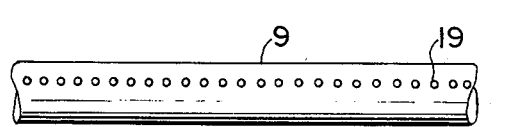
FIG. 3
FIG. 4

SOLAR ENERGY COLLECTOR

CROSS-REFERENCE TO RELATED APPLICATION

This application is a continuation-in-part of application Ser. No. 867,972, filed on Feb. 6, 1978 now abandoned.

BACKGROUND OF THE INVENTION

Field of the Invention

This invention relates to an improved solar energy collector; and more particularly, to a solar energy collector which incorporates both an improved solar energy absorbing element configuration and improved cooperation between a base, solar energy absorbing element and branch conduits for more efficiently absorbing solar energy and transferring the absorbed energy in the form of heat to a flowing fluid.

SUMMARY OF THE INVENTION

An object of the present invention is to provide a solar energy collector which utilizes an accordian shaped solar energy absorbing element having both increased heat absorption and heat transfer surfaces, and accordingly, a high collector efficiency, $F^1$.

Another object is to provide a solar energy collector which utilizes an accordian shaped solar energy absorbing element comprised of upper ridges and lower valleys interconnected by planar surfaces wherein the height of the generally planar surfaces and the included angle of the upper ridges and lower valleys can be easily modified during construction to take into consideration the intended angle of tilt and latitude to thereby maximize surface isolation.

Still another object is to provide a solar energy absorbing element for a solar energy collector wherein the entire surface area of the absorbing element is utilized for absorbing solar energy.

A further object is to provide a solar energy collector utilizing a series of branch fluid conduits, wherein each succeeding branch fluid conduit is larger than the preceding branch fluid conduits in a direction remote from the trough and fluid outlet, thereby providing an incrementally increased flow of fluid through each branch conduit in a direction away from the trough and fluid outlet.

A still further object is to provide a solar energy collector comprising a base and an accordian shaped solar energy absorbing element, the energy absorbing element comprising upper ridges and lower valleys interconnected by generally planar surfaces, wherein the lower valleys are positioned immediately adjacent the base such that the lower valleys are maintained in contact with fluid collected on the base, thereby further improving the heat transfer efficiency from the solar energy absorbing element to the fluid.

Another object is to provide a solar energy collector wherein branch fluid conduits are provided in the upper ridges of the accordian shaped solar energy absorbing element, the branch fluid conduits having a series of apertures for providing an even flow of fluid over the entire absorbing element surface, thereby preventing localized overheating and further improving efficiency of heat transfer from the solar energy absorbing element to the fluid.

More specifically, the present invention is directed to a solar energy collector comprised of a base, a solar energy absorbing element spaced from the base, a fluid supply network positioned between the solar energy absorbing element and the base and a trough for receiving the flow of fluid. The solar energy absorbing element has an accordian-like shape comprised of a plurality of alternating angularly disposed lower valleys and upper ridges interconnected by generally planar surfaces. The lower valley portions of the absorbing element are positioned immediately adjacent to the base. The fluid supply network includes branch conduits positioned immediately adjacent the absorbing element upper ridges for supplying fluid adjacent to the upper ridges which may then flow along the planar surfaces until dropping off the lower valleys onto the base, whereby solar energy collected in the form of heat by the absorbing element is transferred to the fluid. The close positioning of the lower valleys to the base causes the lower valleys to be maintained in contact with the fluid flowing on the base to the trough.

BRIEF DESCRIPTION OF THE DRAWINGS

These and other objects and advantages will become more fully apparent as the following description is read in conjunction with the drawings wherein:

FIG. 1 is a fragmentary top plan view of a solar energy collector according to the preferred embodiment of the invention;

FIG. 2 is a fragmentary side elevational view, in section, of the solar energy collector taken generally along the line II—II of FIG. 1;

FIG. 3 is a fragmentary view of one configuration of branch conduit incorporating a series of slotted apertures; and FIG. 4 is a fragmentary view of an alternative configuration of branch conduit incorporating a series of annular apertures.

DETAILED DESCRIPTION OF THE PREFERRED EMBODIMENT OF THE INVENTION

Referring now to the drawings, FIG. 1 illustrates a solar energy collector 1 according to the present invention. The solar energy collector 1 includes a base 2 preferably formed from a relatively non-heat conductive material and a solar energy absorbing element 3. The solar energy absorbing element 3 is positioned in a plane spaced from and generally parallel to the base.

The solar energy absorbing element 3 has a generally accordian-like configuration comprised of a series of alternating angularly disposed upper ridges 4 and lower valleys 5 interconnected by generally planar surfaces 6. The lower valleys 5 are positioned immediately adjacent or in close approximation to the base 2.

The solar energy collector further comprises a fluid supply network generally designated 7. The fluid supply network comprises a common supply conduit 8 and a plurality of branch conduits 9. The common supply conduit has a fluid inlet 10. Each successive branch conduit 9 in a direction remote from the fluid inlet 10 has an increasingly larger diameter than the preceding branch conduits, as clearly illustrated in FIGS. 1 and 2.

A plurality of supports 11 are provided having their one ends 12 fixed to the base 2 and their other ends 13 supporting the branch conduits in a fixed generally parallel spaced relationship to the base 2. The solar energy absorbing element 3, in turn, is supported in a plane generally parallel to and spaced from the base 2 by the upper periphery of the branch conduits 9.

The upper surface of the solar energy absorbing element 3 is enclosed by an inner clear covering 14 and an outer clear covering 15.

The base 2, solar energy absorbing element 3 and branch conduits 9 are enclosed by insulated sidewalls 16 and an insulated base 17.

The branch conduits 9 may be provided either with a series of slotted fluid apertures 18 as illustrated in FIG. 3, or with a series of annular fluid apertures 19 as illustrated in FIG. 4.

The solar energy collector is provided with an insulated trough 20 along one edge. The trough 20 is provided with one or more outlets 21 which are adapted to be coupled through a conduit 22 to a heated water storage tank.

In operation, a fluid is supplied to the fluid inlet 10 of the common supply conduit 8. The fluid can either be fed under its own pressure, or if necessary, an auxiliary pump can be provided. The fluid then flows into the branch conduits 9. Because the branch conduits 9 have successively larger internal diameters in a direction away from the fluid inlet 10, there is a relatively constant flow of fluid through each of the branch conduits 9. The fluid then flows out of the apertures 18 or 19 provided in each of the branch conduits 9 onto the generally planar surfaces 6 of the solar energy absorbing element 3. The fluid continues to flow down the generally planar surfaces 6 until it reaches the lower valleys 5, whereupon the fluid falls onto the base 2. Since the solar energy collectors would be positioned with the top end somewhat higher in elevation than the bottom end, as indicated by the arrow in FIG. 1, the fluid will flow along the base 2 and into the trough 20 formed at the bottom of the collector. The heated fluid gathered in the trough then flows out through the outlet 21, conduit 22 and into a storage tank ready for further utilization.

The solar energy absorbed in the form of heat by the solar energy absorbing element 3 is thus transferred to the fluid as it flows over the absorbing element 3. Further, by positioning the lower valleys 5 of the absorbing element 3 in close proximity to the base 2, the lower valleys 5 maintain contact with the fluid flowing on the base 2, thereby further transferring heat by conduction to the fluid and increasing the operating efficiency of the solar collector. Also, the generally planar surfaces 6 not only transfer heat to the fluid by conduction as it flows along the surfaces, but the generally planar surfaces also transfer heat to the fluid flowing along the base 2 by convection. Thus, fluid traveling from nearest the top of the solar energy absorber 3, that is, the portion most remote from the trough 20 and outlet 21 will both contact more solar energy absorber lower valleys 5 to be heated by conduction and be heated by convection for a longer period of time as the fluid travels along the base 2 towards the trough 20. Thus, the further the fluid is released from the trough, the greater will be the amount of solar energy, i.e. heat transferred by conduction and convection, that the fluid will be exposed to. The branch conduits 9 are provided with incrementally larger internal fluid carrying diameters in a direction away from the trough 20 and fluid outlet 21 to take advantage of the increased exposure of the longer traveling fluid. That is, fluid is released from the branch conduits 9 in quantities which are directly proportional to the distance to be traveled to the trough 20 and outlet 21.

The accordian-like configuration of the solar absorbing element 3 permits a greatly increased surface area over other configurations such as flat absorbing elements. The accordian-like configuration also permits adjustments to be made to the angle of the upper ridges 4 and lower valleys 5, the length of the generally planar surfaces 6 and also adjustment of the height 23 during manufacture to adjust for the particular local where the solar collector will be installed and to vary the total solar energy absorber surface area without altering the area of the base. It is contemplated that in some installations the angle of the upper ridges 4 and lower valleys 5 may not be symmetrical with respect to a perpendicular extending from the base.

It is contemplated that the fluid utilized can also include air, however, in such a case the heated air would have to be removed from the collector by appropriate transfer equipment.

The present invention may be embodied in other specific forms without parting from the spirit or the essential characteristics thereof. The presently disclosed embodiments are, therefore, to be considered in all respects as illustrative and not restrictive, the scope of the invention being indicated by the appended claims rather than by the foregoing description and all changes which come within the meaning and range of equivalency of the claims are, therefore, to be embraced therein.

What is claimed is:

1. A solar energy collector comprising:

base means;

solar energy absorbing means positioned in a plane spaced from said base means, said solar energy absorbing means having an accordian-like shape comprising a plurality of alternating angularly disposed lower valleys and upper ridges interconnected by generally planar surfaces, said lower valleys being positioned spaced from but immediately adjacent to said base;

fluid supply means positioned between said solar energy absorbing means and said base means immediately adjacent said upper ridges and being adapted for supplying a fluid adjacent said upper ridges; and trough means adapted for receiving a flow of fluid collected on said base;

whereby fluid supplied adjacent said upper ridges will then flow down said planar surfaces thereby transferring heat absorbed by said solar energy absorbing element to the fluid, until dropping off said lower valleys onto said base, the close positioning of said lower valleys to said base providing means for maintaining fluid contact between said lower valleys and the fluid flowing on said base thereby further improving the heat transfer efficiency.

2. A solar energy collector as claimed in claim 1, wherein said fluid supply means comprises a common supply conduit and a plurality of branch conduits in fluid communication with said common supply conduit, each said branch conduit being positioned within, and generally coextensive in length to, a respective said upper ridge, said branch conduits being provided with apertures adapted for releasing fluid adjacent said upper ridges.

3. A solar energy collector as claimed in claim 2, wherein said common supply conduit has an inlet end and each successive branch conduit has an internal diameter larger than the preceding branch conduits in a direction away from said trough for providing a flow of fluid from each said branch conduit which is incrementally larger than the preceding branch conduits, whereby fluid traveling a further distance to said trough will be supplied in greater volume thereby further maximizing efficiency of said solar energy collector.

4. A solar energy collector as claimed in claim 3, wherein said apertures are in the form of a plurality of annular openings spaced along and on opposite sides of each said branch conduit.

5. A solar energy collector as claimed in claim 3, wherein said apertures are in the form of a plurality of axially elongated slots spaced along and on opposite sides of each said branch conduit.

6. A solar energy collector as claimed in claim 3, wherein said base means is formed of a planar material having non-heat conductive characteristics.

7. A solar energy collector as claimed in claim 6 further comprising spaced inner and outer clear material covering means lying in planes generally parallel to and spaced from said solar energy absorbing means on a side of said solar energy absorbing means opposite from said base means.

8. A solar energy collector as claimed in claim 7 further comprising a plurality of support means extending from said base means for rigidly supporting each of said branch conduits.

9. A solar energy collector as claimed in claim 8 further comprising a heat insulative housing means cooperating with said inner and outer clear material covering means for enclosing said base means and said solar energy absorbing means.

* * * * *